*(12)* United States Patent
Kinoshita et al.

*(10)* Patent No.: US 7,859,854 B2
*(45)* Date of Patent: Dec. 28, 2010

(54) ELECTRONIC APPARATUS

(75) Inventors: Hideki Kinoshita, Saitama (JP); Jun Togashi, Saitama (JP)

(73) Assignee: Pioneer Corporation, Tokyo (JP)

( * ) Notice: Subject to any disclaimer, the term of this patent is extended or adjusted under 35 U.S.C. 154(b) by 458 days.

(21) Appl. No.: 11/992,192

(22) PCT Filed: Aug. 14, 2006

(86) PCT No.: PCT/JP2006/316015

§ 371 (c)(1),
(2), (4) Date: Mar. 18, 2008

(87) PCT Pub. No.: WO2007/039987

PCT Pub. Date: Apr. 12, 2007

(65) Prior Publication Data

US 2009/0153002 A1    Jun. 18, 2009

(30) Foreign Application Priority Data

Sep. 30, 2005    (JP)    ............................. 2005-287204

(51) Int. Cl.
*H05K 5/00*    (2006.01)
(52) U.S. Cl. .................. 361/752; 361/753; 361/759; 369/77.1
(58) Field of Classification Search .......... 361/730, 361/741, 747, 752–754, 759, 790, 796–802; 720/646, 647; 312/223.1, 223.2; 369/75.1, 369/75.2, 77.1
See application file for complete search history.

(56) References Cited

U.S. PATENT DOCUMENTS

| | | | | |
|---|---|---|---|---|
| 5,848,042 | A * | 12/1998 | Takahashi et al. | ........... 720/647 |
| 5,852,594 | A * | 12/1998 | Kaise et al. | ................. 720/647 |
| 5,953,302 | A * | 9/1999 | Kobayashi | .................. 720/647 |
| 6,243,347 | B1 | 6/2001 | Kawana et al. | |
| 6,398,168 | B1 * | 6/2002 | O Tae | ......................... 248/27.3 |
| 7,004,397 | B2 * | 2/2006 | Fujita et al. | ................. 235/476 |
| 7,513,785 | B2 * | 4/2009 | Kinoshita et al. | ........... 439/159 |
| 2002/0135988 | A1 | 9/2002 | Kawada et al. | |

FOREIGN PATENT DOCUMENTS

| | | |
|---|---|---|
| JP | 08-329578 A | 12/1996 |
| JP | 2002-288593 A | 10/2002 |
| JP | 2003-173423 A | 6/2003 |

* cited by examiner

*Primary Examiner*—Hung S Bui
(74) *Attorney, Agent, or Firm*—Foley & Lardner LLP

(57) ABSTRACT

In-vehicle electronic equipment includes an operation display panel, an opening-closing mechanism, a housing unit, a photosensor, and a control device. The opening-closing mechanism selectively moves the operation display panel to an open position and a closed position. The housing unit is configured to house an electronic device together with a connector connected to the electronic device. The photosensor detects whether an electronic device is housed in the housing unit. The control device controls the opening-closing mechanism. When the photosensor detects that no electronic device is housed in the housing unit while the operation display panel is in the open position, the control unit controls the opening-closing mechanism not to bring the display unit to the closed position.

5 Claims, 10 Drawing Sheets

CLOSED POSITION

CLOSED POSITION

OPEN POSITION

OPEN POSITION

ELECTRONIC APPARATUS

TECHNICAL FIELD

The present invention relates to electronic equipment, and more specifically, relates to electronic equipment that includes an opening-closing mechanism that uncovers an insert face by opening an operation display panel.

BACKGROUND ART

Generally, a cabin of a vehicle, such as a passenger car, a truck, and a bus, is equipped with in-vehicle electronic equipment, for example, a car audio system and a car navigation system. Some of the in-vehicle electronic equipment are equipped with a disk device that plays (records) a disk such as CD or DVD when inserted with the disk, and a slot that electrically connects the recording medium to the in-vehicle electronic equipment and enables data communication when inserted with a recording medium produced in accordance with predetermined specifications as to, for example, shape.

Some of such in-vehicle electronic equipment include an operation display panel and an opening-closing mechanism that moves the operation display panel to open and closed positions. Arranged on the operation display panel are buttons for operating the in-vehicle electronic equipment, a monitor that displays an operational state, and the like. An insert face configured to be uncovered when the operation display panel is set in the open position by the opening-closing mechanism is formed on the front surface (surface on the cabin side) of the in-vehicle electronic equipment. A disk insert slot through which a disk is inserted into the disk device, and an insert slot into which the recording medium is inserted are formed on the insert face. In other words, when playing (recording) a disk, or performing reciprocal data communication by electrically connecting a recording medium to the in-vehicle electronic equipment, a user brings the operation display panel into the open position with the opening-closing mechanism to uncover the insert face, and then inserts the disk from the disk insert slot, or inserts the recording medium from the insert slot.

When unloading the disk from the disk device via the disk insert slot, if the operation display panel in the open position is closed, the operation display panel may hit against the disk, and may damage a recording surface of the disk. For this reason, some of conventional in-vehicle electronic equipment are configured to load the disk with an unloading unit, or to produce an alarm sound with an alarm-sound producing unit, if the in-vehicle electronic equipment detects that the operation display panel (grille) is not in the open position, when the disk is positioned at the disk insert slot, or while unloading the disk, for example, as described in Patent Document 1.

Patent Document 1: Japanese Patent Application Laid-open No. H8-329578

DISCLOSURE OF INVENTION

Problem to be Solved by the Invention

Recently, some of in-vehicle electronic equipment can be electrically connected to a connection-object electronic device by using a connecter produced in accordance with, for example, the USB standard, the IEEE1394 standard, or the SCSI standard. In-vehicle electronic equipment that includes an operation display panel and an opening-closing mechanism is configured such that a receiving-side connector that meets the standard is arranged on the insert face in an uncovered manner. Consequently, when electrically connecting a connection-object electronic device to the in-vehicle electronic equipment, a connection-side connector of the connection-object electronic device is connected to the receiving-side connector uncovered at the insert face, while the operation display panel is kept in the open position.

In other words, unlike a disk or a recording medium of which specifications, such as the shape, are predetermined, the connection-object electronic device is uncovered outwardly to the outside of the in-vehicle electronic equipment, i.e., to the operation display panel side from the insert face. If the connection-object electronic device after connected is uncovered in the cabin, for example, part of the body of a user, or the operation display panel that is being closed with the opening-closing mechanism may contact or hit against the connection-object electronic device, so that the connection between the connection-side connector and the receiving-side connector may become unsatisfactory, consequently, there is a possibility that an electrical connection between the connection-object electronic device and the in-vehicle electronic equipment is forcedly canceled.

For this reason, when connecting a connection-object electronic device by using such connector, it is desired that while a connection-side connector is kept connected to the receiving-side connector configured to be uncovered at the insert face, the connection-side connector and the receiving-side connector are housed inside the in-vehicle electronic equipment. Because shapes of connection-object electronic devices are varied widely, it is impossible to construct a connector housing unit applicable to any shape. Therefore, the connector housing unit can house only connection-object electronic devices in a predetermined shape, and cannot house connection-object electronic devices in shapes other than the predetermined shape.

To prevent forced cancellation of the electrical connection between the in-vehicle electronic equipment and the connection-object electronic device, if the in-vehicle electronic equipment is configured not to close the operation display panel when the connection-object electronic device is connected, the operation display panel remains in the open position even when the connection-object electronic device in the predetermined shape is housed, so that visibility and operationality of the operation display panel is constantly poor, which is a problem. Additionally, if the in-vehicle electronic equipment is configured to close the operation display panel as it is determined that the connection-object electronic device is already housed inside the in-vehicle electronic equipment simply because the connection-object electronic device is connected, this leads to a problem that an electrical connection to a connection-object electronic device in a shape difficult to be housed is forcedly canceled.

The present invention has been achieved to solve the problems explained above as examples in the conventional technology and it is an object of the present invention to provide electronic equipment capable of preventing forced cancellation of an electrical connection to a connection-object electronic device regardless of the shape of the connection-object electronic device of which connection-side connector is connected to a receiving-side connector, and avoiding worsened visibility and inferior operationality of an operation display panel.

Means for Solving Problem

According to an aspect of the present invention, there is provided electronic equipment that includes an operation display panel through which operation of the electronic equipment is specified and on which status of the operation is displayed; an opening-closing mechanism that uncovers an insert face by bringing the operation display panel to an open position; a connector housing unit that includes a receiving-side connector configured to be uncovered on the insert face and connected to a connection-side connector of a connection-object electronic device capable of data communication when electrically connected to the electronic equipment, and that is configured to house a retractable connection-object electronic device, among connection-object electronic devices, together with the receiving-side connector connected to the connection-side connector; a housing detecting unit that detects whether a connection-object electronic device is housed in the connector housing unit; and a control device that controls opening and closing operation of the opening-closing mechanism. When the housing detecting unit detects that a connection-object electronic device is housed in the connector housing unit while the operation display panel is in the open position, the control unit closes or permits closing the operation display panel. When the housing detecting unit does not detect that a connection-object electronic device is housed in the connector housing unit while the operation display panel is in the open position, the control unit inhibits closing the operation display panel.

Effect of the Invention

Electronic equipment according to the present invention can prevent forced cancellation of an electrical connection to a connection-object electronic device, regardless of the shape of the connection-object electronic device of which connection-side connector is connected to a receiving-side connector.

BRIEF DESCRIPTION OF DRAWINGS

FIG. 1-2 is a schematic side view of the in-vehicle electronic equipment according to the embodiment.

FIG. 2 is a schematic diagram of a configuration example of a connector housing unit.

FIG. 3-1 is a front view of an operation display panel of the in-vehicle electronic equipment in an open position according to the embodiment.

FIG. 3-2 is a schematic side view of the operation display panel of the in-vehicle electronic equipment in the open position according to the example.

EXPLANATIONS OF LETTERS OR NUMERALS

Figure 1:
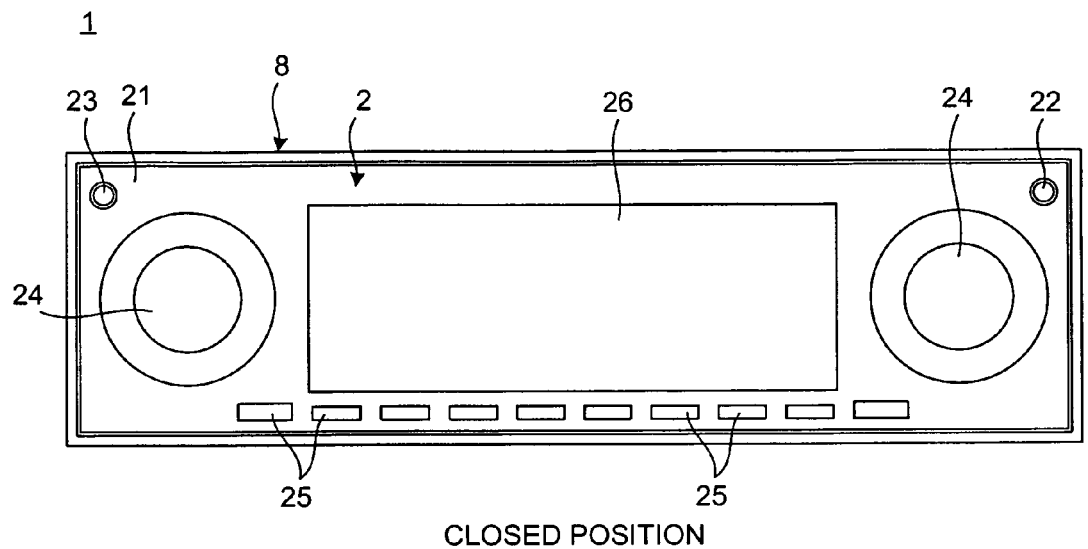
FIG. 1-1 is a front view of an in-vehicle electronic equipment according to an embodiment.

1 In-vehicle electronic equipment (electronic equipment)
11 Insert face
12 USB-connection insert slot
13 Disk insert slot
14 Through-hole
2 Operation display panel
21 Front surface
22 PWR button
23 Open-close button
24 Adjustment knobs
25 Control buttons
26 Monitor
3 Opening-closing mechanism
31 opening-closing mechanism body
32, 33 Hinges
4 Connector housing unit
41 Receiving-side connector
42 Taking-out spring
43 Connection-time restriction unit
43a Stopper member
43b Slide member
43c Stopper rotating shaft
43d Stopper spring
44 Housed-time restriction unit
44a Slid pin
44b Slid-pin spring
44c Eject button
44d Eject-button spring
44e Slope
44f Projection
45 Housing
45a Housing area
45b Notch
45c, 45e Supporting unit
45d Through-hole
5 Disk device
6 Control device
7 Photosensor (detecting unit)
71 Body
72 Light-emitting and light-receiving unit
73 Reflection unit
8 Casing
9 USB memory (retractable connection-object electronic device)
91 Connection-side connector
92 Projection
10 USB memory (non-retractable connection-object electronic device)
101 Connection-side connector
20 Switch
201 Body
202 Contact area
D Disk

BEST MODE(S) FOR CARRYING OUT THE INVENTION

The present invention is explained below in detail with reference to the accompanying drawings. The present invention is not limited to the following embodiments. Components described in the following embodiments include those that can be easily conceived by a person skilled in the art, or those substantially equivalent thereto.

First Embodiment

Electronic equipment according to a first embodiment includes an operation display panel, an opening-closing mechanism, a connector housing unit, a detecting unit, and a control unit. The operation display panel is configured to cover an insert face of the electronic equipment. The opening-closing mechanism brings the operation display panel that covers the insert face to an open position or a closed position. The connector housing unit includes a receiving-side connector configured to be uncovered at the insert face, and to be connected to a connection-side connector of a connection-object electronic device. The connector housing unit houses a retractable connection-object electronic device, among connection-object electronic devices, of which connection-side connector is connected to the receiving-side connector, together with the receiving-side connector connected to the connection-side connector of the retractable connection-object electronic device, by inserting the retractable connection-object electronic device into the inside of the connector housing unit. The detecting unit detects a housed state of a connection-object electronic device in the connector housing unit. The control unit controls opening and closing operation performed by the opening-closing mechanism.

In the electronic equipment of the first embodiment, while the operation display panel is in the open position by the opening-closing mechanism, the detecting unit detects a housed state of a connection-object electronic device in the connector housing unit. When the detecting unit detects that a connection-object electronic device is housed in the connector housing unit, the control unit moves the operation display panel to the closed position through the opening-closing mechanism, or permits closing the operation display panel with the opening-closing mechanism. By contrast, when the detecting unit does not detect that a connection-object electronic device is housed in the connector housing unit, the control unit inhibits closing the operation display panel with the opening-closing mechanism.

In the electronic equipment of the first embodiment having the above configuration, the control unit can selectively moves the operation display panel to the open position and the closed position by the opening-closing mechanism according to a housed state of a connection-object electronic device in the connector housing unit. If a connection-object electronic device is housed in the connector housing unit, the control unit brings the operation display panel to the closed position by the opening-closing mechanism. Accordingly, if the connection-object electronic device of which connection-side connector is connected to the receiving-side connector is a retractable connection-object electronic device, the insert face is covered by the operation display panel. Thus, the operation display panel can be easily viewed and operated. If the connection-object electronic device of which connection-side connector is connected to the receiving-side connector is a retractable connection-object electronic device, the connection-object electronic device is housed in the connector housing unit. Therefore, it is possible to prevent part of the body of a user from contacting or hitting against the connection-object electronic device.

If a connection-object electronic device of which connection-side connector is connected to the receiving-side connector is not housed in the connector housing unit and projects from the insert face, the operation display panel is not brought to the closed position by the opening-closing mechanism. If a connection-object electronic device is not housed in the connector housing unit, the control unit maintains the operation display panel in the open position with the opening-closing mechanism. Accordingly, even if a connection-object electronic device of which connection-side connector is connected to the receiving-side connector is not housed in the connector housing unit and projects from the insert face, this does not cause a situation that the operation display panel contacts or hits against the connection-object electronic device by closing the operation display panel with the opening-closing mechanism.

Thus, forced cancellation of an electrical connection to the connection-object electronic device can be prevented regardless of the shape of the connection-object electronic device of which connection-side connector is connected to the receiving-side connector. Moreover, worsened visibility and inferior operationality of the operation display panel can be avoided.

Second Embodiment

Electronic equipment according to a second embodiment further includes a connection-state acquiring unit in the electronic equipment according to the first embodiment. The connection-state acquiring unit acquires a state of an electrical connection between a connection-object electronic device and the electronic equipment, precisely, a connection between a connection-side connector of the connection-object electronic device and the receiving-side connector of the electronic equipment.

In the electronic equipment of the second embodiment, while the operation display panel is in the open position by the opening-closing mechanism, and when the detecting unit does not detect that a connection-object electronic device is housed in the connector housing unit, the control unit acquires an electrical connection state between the connection-object electronic device and the electronic equipment with the connection-state acquiring unit. When the connection-state acquiring unit detects that the connection-object electronic device is not electrically connected to the electronic equipment, the control unit brings the operation display panel to the closed position through the opening-closing mechanism, or permits closing the operation display panel with the opening-closing mechanism. By contrast, when the connection-state acquiring unit detects that the connection-object electronic device is electrically connected to the electronic equipment, the control unit inhibits closing the operation display panel with the opening-closing mechanism.

In the electronic equipment of the second embodiment having the above configuration, the opening-closing mechanism can selectively moves the operation display panel to the open position and the closed position according to a housed state of a connection-object electronic device in the connector housing unit, and an electrical connection state between the connection-object electronic device and the electronic equipment. If the connection-object electronic device is not housed in the connector housing unit, and the connection-object electronic device is not electrically connected to the electronic equipment, the operation display panel can be closed by the opening-closing mechanism. In other words, the control unit maintains the operation display panel in the open position by the opening-closing mechanism only when the connection-object electronic device is not housed in the connector housing unit, and the connection-object electronic device is electrically connected to the electronic equipment. Therefore, if the operation display panel is to be closed when the electrical connection to the connection-object electronic device is not forcedly canceled, the control unit can close the operation display panel with the opening-closing mechanism. Thus, as in the electronic equipment according to the first embodiment, forced cancellation of the electrical connection to the connection-object electronic device can be prevented regardless of the shape of the connection-object electronic device of which connection-side connector is connected to the receiving-side connector. Moreover, worsened visibility and inferior operationality of the operation display panel can be further avoided.

Third Embodiment

Electronic equipment according to a third embodiment includes a photosensor that detects that a connection-object electronic device projects from the insert face to the operation display panel side as with the detecting unit in the electronic equipment according to the first or second embodiment. Thus, the electronic equipment has functions and effects similar to the electronic equipment according to the first and second embodiments, and can reliably detect that a connection-object electronic device of which connection-side connector is connected to the receiving-side connector is not housed in the connector housing unit.

Fourth Embodiment

Electronic equipment according to a fourth embodiment includes a switch as the detecting unit in the electronic equipment according to the first or second embodiment, and the switch is configured to be ON in response to contact with a connection-object electronic device resulting from an action that the connection-object electronic device is housed in the connector housing unit such that the connection-object electronic device does not project from the insert face to the operation display panel side. Thus, the electronic equipment has functions and effects similar to the electronic equipment according to the first and second embodiments, and can reliably detect that the connector housing unit does not house a connection-object electronic device other than a retractable connection-object electronic device capable of contacting the switch in the connector housing unit.

Fifth Embodiment

Electronic equipment according to a fifth embodiment is the electronic equipment according to any one of the first to fourth embodiments that is configured to be mounted inside a cabin of a vehicle. Thus, the electronic equipment has functions and effects similar to the electronic equipment according to the first to fourth embodiments even if mounted inside a cabin of a vehicle, in which part of the body of a user is apt to contact or hit against a connection-object electronic device of which connection-side connector is connected to the receiving-side connector.

Example Embodiment

Figures 1, 2:
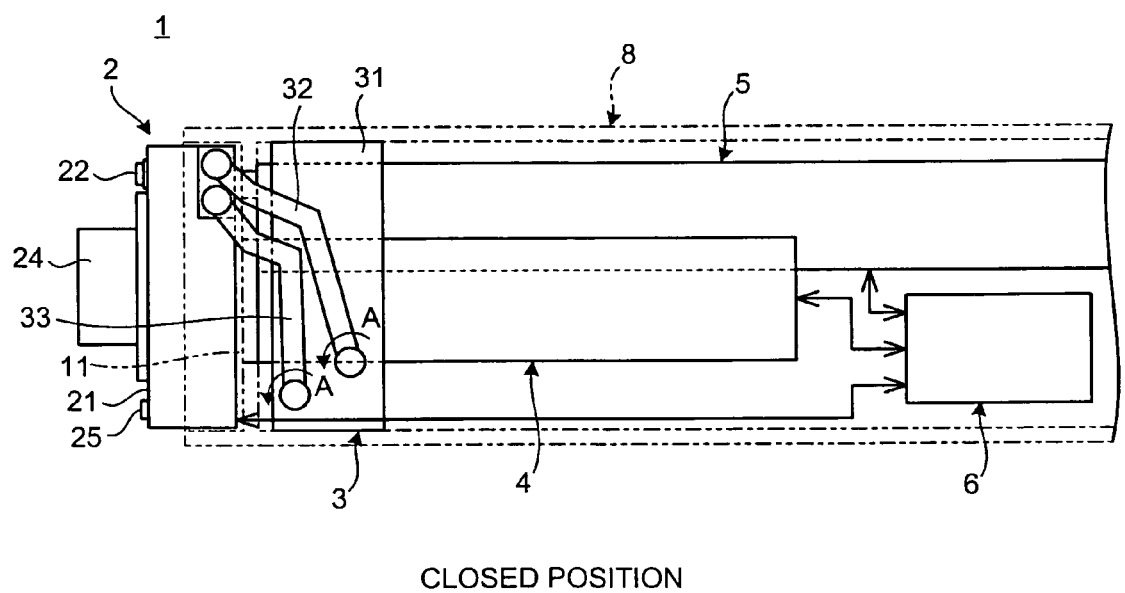
Figure 2:
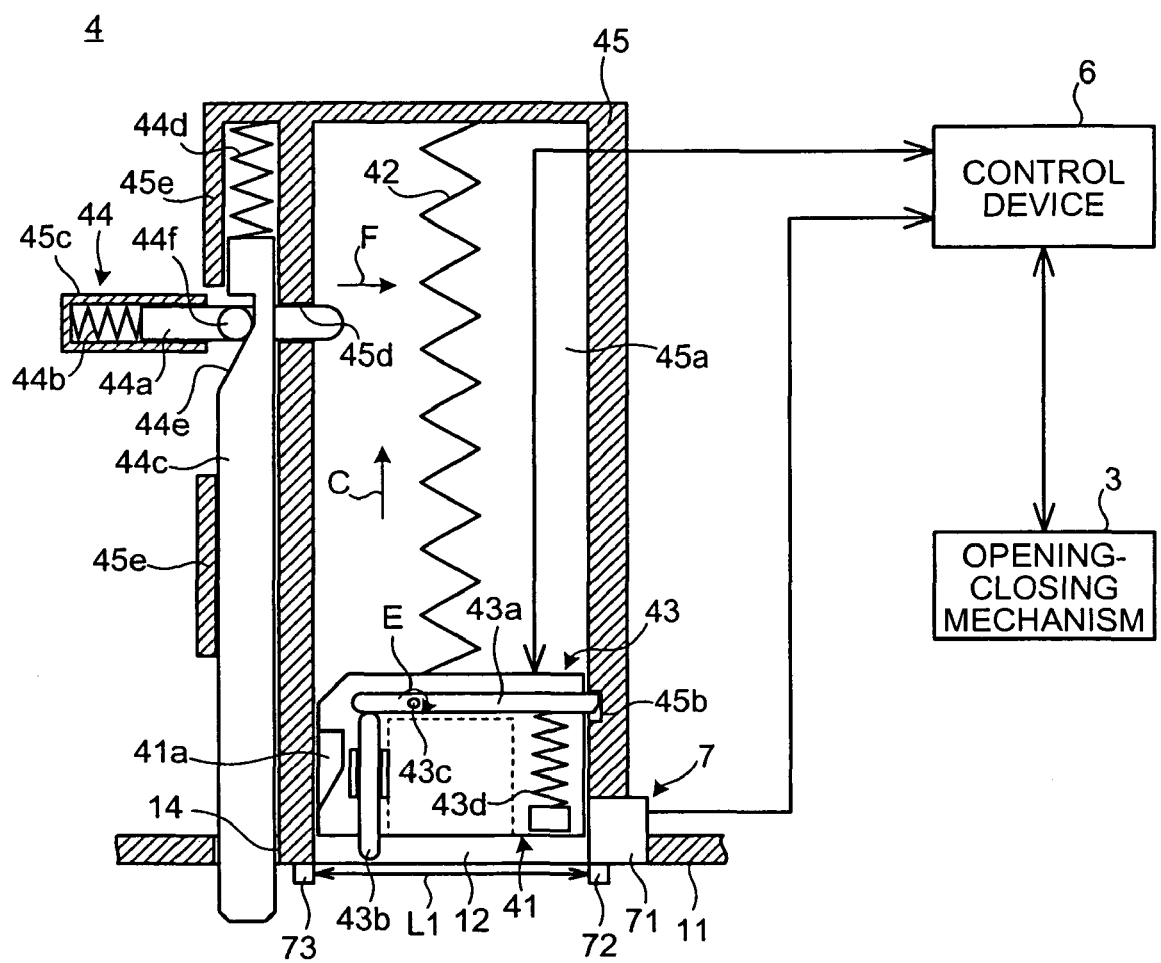
Figure 2:
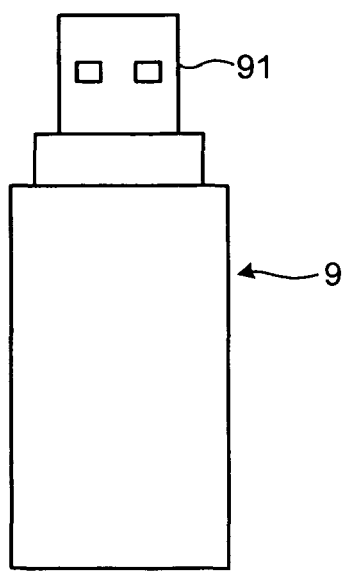
Figures 1, 3:
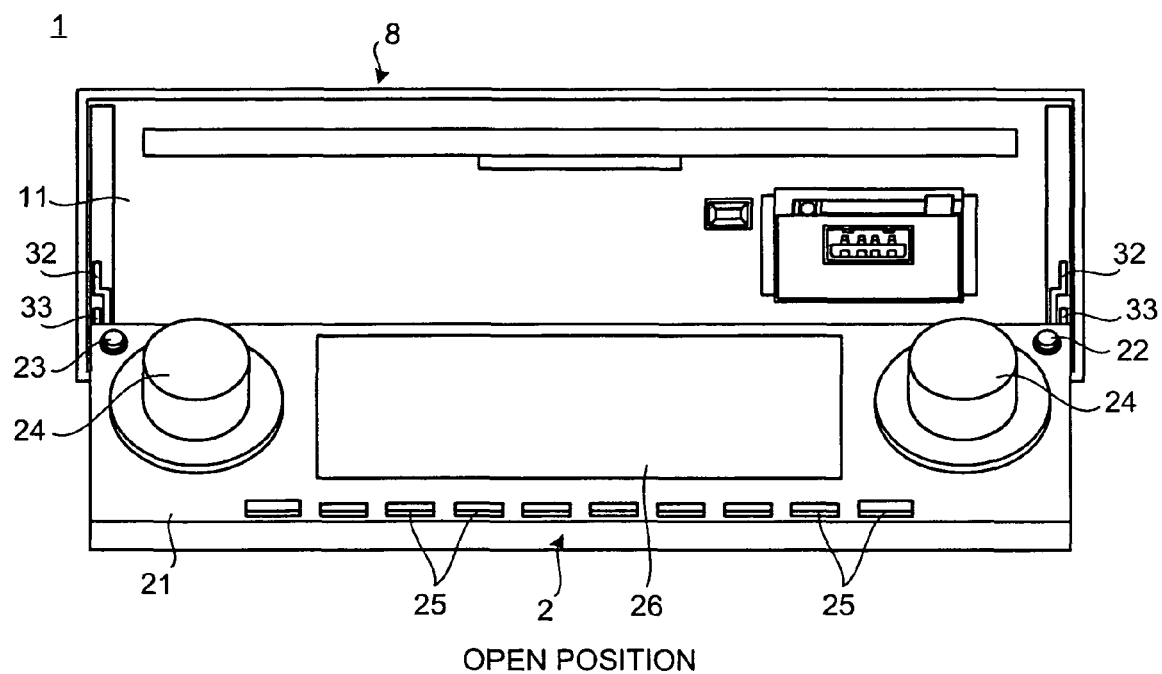
Figures 2, 3:
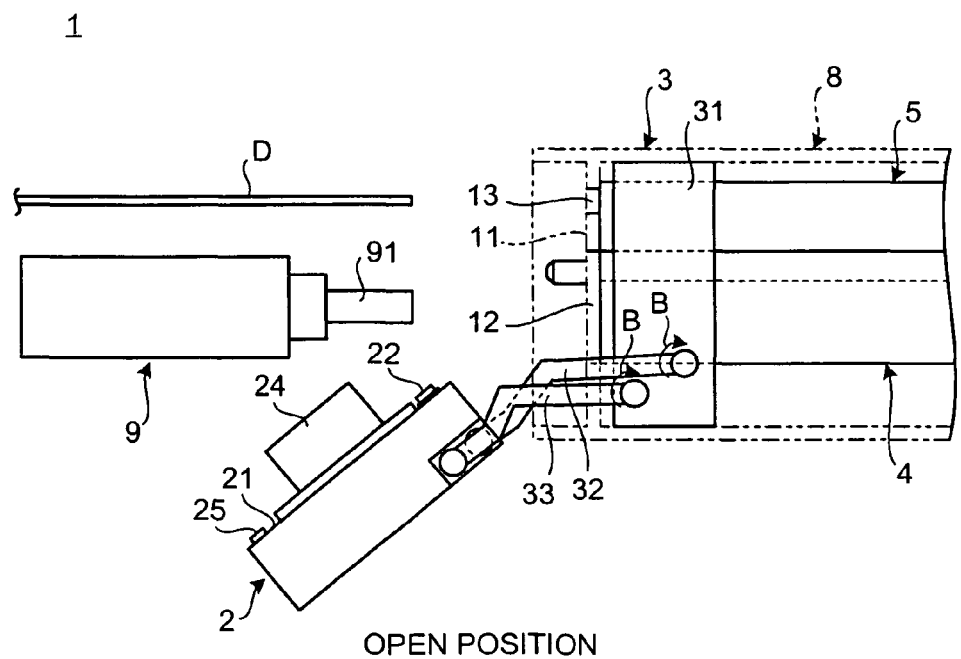

FIGS. 1-1 and 1-2 are schematic diagrams that depict a configuration example of a disk device that includes a feeding mechanism according to an example embodiment. FIG. 2 is a schematic diagram that depicts a configuration example of a connector housing unit. FIGS. 3-1 and 3-2 are schematic diagrams that depict an operation display panel of in-vehicle electronic equipment in an open position or state according to the example embodiment. FIGS. 4 to 7 are schematic diagrams for explaining movements of the connector housing unit.

The electronic equipment is explained below as in-vehicle electronic equipment to be mounted inside a cabin of a vehicle; however, the present invention is not so limited, but can also be applicable to any electronic equipment, such as a connector housing unit, provided with an opening-closing mechanism for opening and closing of an operation display panel. Specifically, electronic equipment that includes a disk device in addition to the connector housing unit is explained in the following example embodiment; however, the present invention is not limited to this. For example, the electronic equipment can be configured to include no disk device. In addition to the disk device, the electronic equipment can include a slot that is configured to be inserted with a recording medium produced in accordance with predetermined specifications as to, for example, shape, so that the recording medium is electrically connected to the electronic equipment, or an HDD (Hard Disk Drive) device including a hard disk as a recording medium that can records thereon and reproduce a large volume of data.

Additionally, a USB (Universal Serial Bus) memory that is a recording medium having a connector according to the USB standard is explained in the following example embodiment as a connection-object electronic device; however, the present invention is not so limited. For example, the connection-object electronic device can be a recording medium according to other standards, such as the IEEE1394 standard or the SCSI standard, or portable electronic equipment that can be carried along by a user, such as a notebook personal computer or a PDA (Personal Digital Assistance). In such case, a connection-side connector is directly provided in the portable electronic equipment, or provided via a cable.

As shown in FIGS. 1-1, 1-2, and 2, an in-vehicle electronic equipment 1 includes an operation display panel 2, an opening-closing mechanism 3, a connector housing unit 4, a disk device 5, a control device 6, and a photosensor 7. A casing 8 accommodates the opening-closing mechanism 3, the connector housing unit 4, the disk device 5, the control device 6, and the photosensor 7. A USB memory 9 is a connection-object electronic device that can perform data communication when electrically connected to the in-vehicle electronic equipment 1, and is also a retractable connection-object electronic device.

The operation display panel 2 is configured to cover an insert face 11 of the in-vehicle electronic equipment 1, when the operation display panel 2 is held in a closed position or state by the opening-closing mechanism 3. The operation display panel 2 includes input units for providing instructions on operation of the in-vehicle electronic equipment 1, and a display unit that displays an operational state of the in-vehicle electronic equipment 1. On a front surface 21 of the operation display panel 2 are provided as the input units a PWR button 22, an open-close button 23, a plurality of adjustment knobs 24, and a plurality of control buttons 25. The PWR button 22 is used for providing an instruction of activating or stopping the in-vehicle electronic equipment 1. The open-close button 23 is used for providing an instruction on an opening or closing movement of the operation display panel 2. The adjustment knobs 24 are used for providing an instruction on adjustment, such as adjustment of the sound volume. The control buttons 25 are used for providing an instruction on other operations of the in-vehicle electronic equipment 1. In addition, a monitor 26 is provided as a display unit on the front surface 21 of the operation display panel 2. The input units and the display unit are connected to the control device 6. Accordingly, the control device 6 receives various input signals of instructions on operation of the in-vehicle electronic equipment 1 from the input units, and outputs an operational state of the in-vehicle electronic equipment 1 as a display signal to the display unit.

The opening-closing mechanism 3 selectively moves the operation display panel 2 configured to cover the insert face 11 to the open position or the closed position, and includes an opening-closing mechanism body 31, and two each of hinges 32 and 33. The opening-closing mechanism body 31 is provided with a not-shown drive source, for example, a motor. The not-shown drive source rotates two each of the hinges 32 and 33 with a driving force of the drive source. Two each of the hinges 32 and 33 are each rotatably supported by the opening-closing mechanism body 31 and the operation display panel 2. The operation display panel 2 is brought to the open position or the closed position as two each of the hinges 32 and 33 rotate with a driving force given from the not-shown drive source (see FIGS. 3-1 and 3-2).

The opening-closing mechanism 3 is controlled by the control device 6 as a control unit. For example, upon receiving an ON signal input from the open-close button 23 while the operation display panel 2 is in the closed position, the control device 6 outputs an open signal to the opening-closing mechanism 3. Accordingly, the opening-closing mechanism 3 rotates two each of the hinges 32 and 33 in the direction of arrows A with the not-shown drive source (see FIG. 1-2) to bring the operation display panel 2 to the open position as shown in FIG. 3-2, and maintains it in the open position. In addition, for example, while the operation display panel 2 is in the open position, upon detecting that a disk is inserted and loaded into the disk device 5 or upon detecting that the USB memory 9 is hused in the connector housing unit 4 by the photosensor 7, the control device 6 outputs a close signal to the opening-closing mechanism 3. Accordingly, the opening-closing mechanism 3 rotates two each of the hinges 32 and 33 in the direction of arrows B with the not-shown drive source (see FIG. 3-2) to bring the operation display panel 2 to the closed position as shown in FIG. 1-2, and maintains it in the closed position.

As shown in FIG. 2, the connector housing unit 4 is configured to house therein a retractable connection-object electronic device among connection-object electronic devices, in this embodiment, the USB memory 9 in a shape that can be entirely housed in the connector housing unit 4, while maintaining an electrical connection between the USB memory 9 and the in-vehicle electronic equipment 1. The connector housing unit 4 includes a receiving-side connector 41, a taking-out spring 42, a connection-time restriction unit 43, a housed-time restriction unit 44, and a housing 45. The receiving-side connector 41 is supported slidably in the longitudinal direction of a housing area 45a formed in the housing 45. A female connector according to the USB standard is formed on the receiving-side connector 41, which is configured to be capable of connecting to a connection-side connector of a connection-object electronic device, in this embodiment, a connection-side connector 91 (male connector) of the USB memory 9. The receiving-side connector 41 is connected to the control device 6, and as the connection-side connector 91 is connected, the USB memory 9 is electrically connected to the in-vehicle electronic equipment 1. An end of the housing area 45a communicates with a USB-connection insert slot 12 formed at the insert face 11.

The taking-out spring 42 is arranged between the other end of the housing area 45a in the housing 45 and the receiving-side connector 41. From among sliding directions of the receiving-side connector 41, the taking-out spring 42 is configured to apply a taking-out pressure to the receiving-side connector 41 in a taking-out direction, which is in reverse of a housing direction indicated by an arrow C shown in the drawings.

When the receiving-side connector 41 is connected to the connection-side connector of the retractable connection-object electronic device among connection-object electronic devices, i.e., the connection-side connector 91 of the USB memory 9 in this embodiment, the connection-time restriction unit 43 restricts a movement of the receiving-side connector 41 from a connection position towards the housing direction. The connection-time restriction unit includes a stopper member 43a, a slide member 43b, a stopper rotating shaft 43c, and a stopper spring 43d, which is a stopper pressing unit.

The stopper member 43a is supported by the stopper rotating shaft 43c rotatably to the receiving-side connector 41. In the housing area 45a is formed a notch 45b into which an end of the stopper member 43a comes when the receiving-side connector 41 is in the connection position (see FIG. 2) at which the receiving-side connector 41 is uncovered by the taking-out spring 42 from the USB-connection insert slot 12 to the insert face 11.

The slide member 43b is supported movably in the housing direction and the taking-out direction with respect to the receiving-side connector 41. The slide member 43b is arranged in the receiving-side connector 41 such that an end of the slide member 43b is in contact with the other end of the stopper member 43a, and the other end of the slide member 43b projects from the receiving-side connector 41 to the taking-out direction.

The stopper spring 43d is arranged between the receiving-side connector 41 and the stopper member 43a. The stopper spring 43d applies a connection-time restriction pressure to the stopper member 43a in a reverse direction of a direction of the slide member 43b moving to the housing direction indicated by an arrow E shown in the drawings from among rotational directions of the stopper member 43a. The connection-time restriction pressure applied from the stopper spring 43d is set such that an end of the stopper member 43a can comes into the notch 45b when no external force is applied to the stopper member 43a.

The housed-time restriction unit 44 restricts a movement of the receiving-side connector 41 towards the taking-out direction when the retractable connection-object electronic device among connection-object electronic devices, i.e., the USB memory 9 in this embodiment, of which connection-side connector is connected to the receiving-side connector 41, is housed in the housing area 45a together with the receiving-side connector 41 connected to the connection-side connector 91. The housed-time restriction unit 44 also cancels the restricted state. The housed-time restriction unit includes a slid pin 44a, a slid-pin spring 44b that is a slid-pin pressing unit, an eject button 44c, and an eject-button spring 44d that is an eject-button pressing unit.

The slid pin 44a is slidably supported by a supporting unit 45c of the housing 45. On the receiving-side connector 41 is formed a notch 41a into which an end of the slid pin 44a comes when the receiving-side connector 41 is in the housing position (see FIG. 5) at which the whole of the USB memory 9 can be housed in the housing area 45a.

The slid-pin spring 44b is arranged in between the supporting unit 45c and the slid pin 44a. The slid-pin spring 44b applies a housed-time restriction pressure to the slid pin 44a in a direction indicated by an arrow F shown in the drawings in which the slid pin 44a comes into the notch 41a on the receiving-side connector 41 from among sliding directions of the slid pin 44a. The housed-time restriction pressure applied from the slid-pin spring 44b is set such that an end of the slid pin 44a comes through a through-hole 45d of the housing 45 and projects into the housing area 45a when no external force is applied to the slid pin 44a.

The eject button 44c is slidably supported by a supporting unit 45e of the housing 45. A slope 44e is formed on the eject button 44c at a position opposite to the slid pin 44a. A projection 44f that is in contact with the slope 44e is formed on the slid pin 44a at a position opposite to the eject button 44c.

The eject-button spring 44d is arranged in between the supporting unit 45e and the eject button 44c. The eject-button spring 44d applies pressure to the eject button 44c in the taking-out direction from among sliding directions of the eject button 44c. The pressure applied by the eject-button spring 44d is set such that an end of the eject button 44c comes through a through-hole 14 on the insert face 11 and projects from the insert face 11 to the operation display panel side when no external force is applied to the eject button 44c.

Movements of the connector housing unit 4 configured as described above are explained below. Explained first is the case of electrically connecting a retractable connection-object electronic device among connection-object electronic devices, i.e., the USB memory 9 in this embodiment, to the in-vehicle electronic equipment, and housing the USB memory 9 into the connector housing unit 4.

Figure 4:
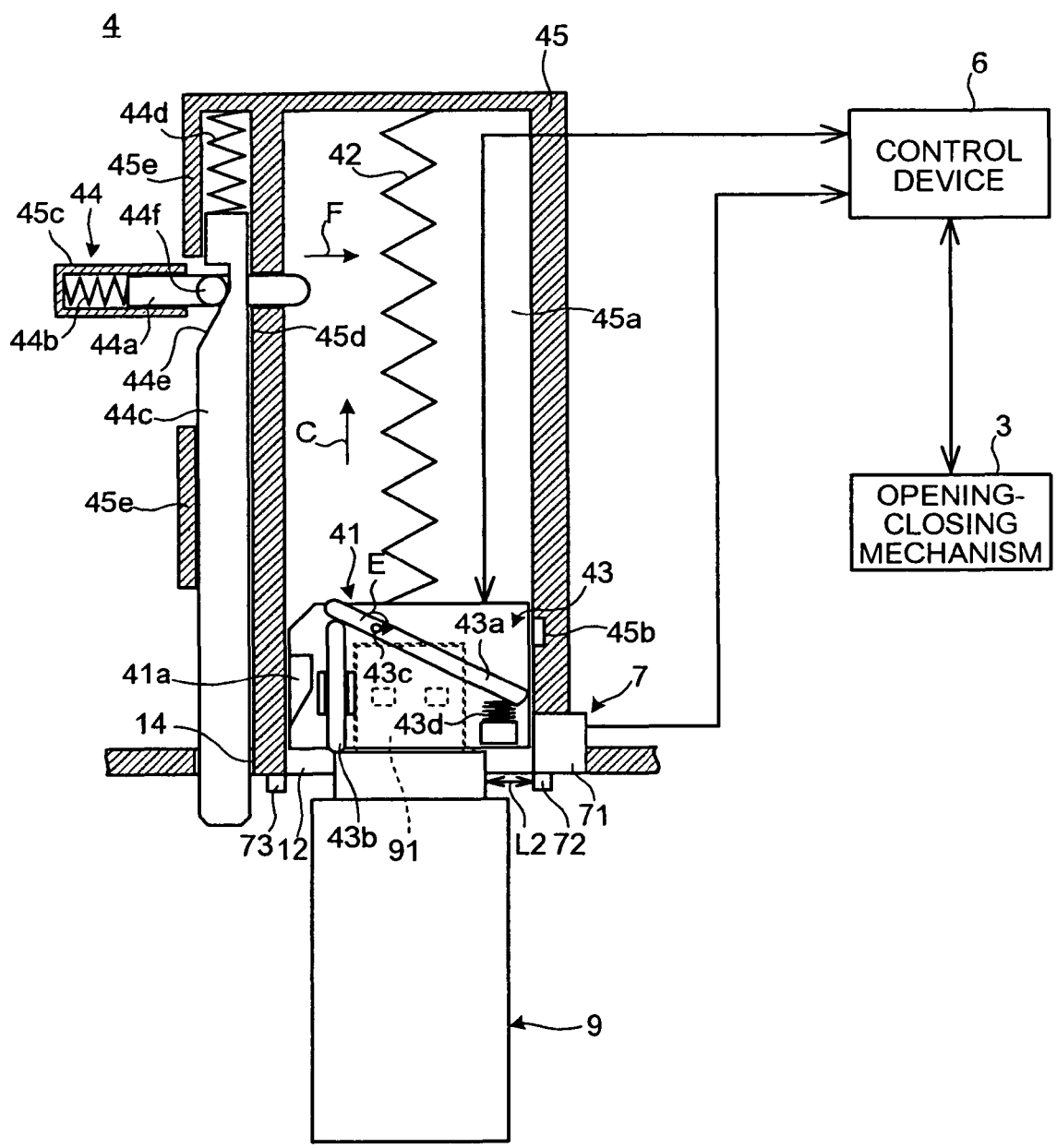
FIG. 4 is a schematic diagram for explaining a movement of the connector housing unit.

As shown in FIG. 2, the USB memory 9 is arranged such that the connection-side connector 91 face to the receiving-side connector 41, and the USB memory 9 is inserted into the housing area 45a from the USB-connection insert slot 12 by pressing the USB memory 9 to the housing direction indicated by the arrow C in the drawings. The connection-side connector 91 of the USB memory 9 inserted in the USB-connection insert slot 12 contacts with the receiving-side connector 41, and then tries to move to the housing direction together with the receiving-side connector 41. At the moment, the receiving-side connector 41 is restricted on the movement from the connection position towards the housing direction by the connection-time restriction unit 43. Consequently, as shown in FIG. 4, the connection-side connector 91 is connected to the receiving-side connector 41, and the USB memory 9 is connected to the control device 6 via the receiving-side connector 41, so that the USB memory 9 is electrically connected to the in-vehicle electronic equipment 1.

When the connection-side connector 91 is connected to the receiving-side connector 41, the vicinity of the connection-side connector 91 of the USB memory 9 comes in contact with the slide member 43b of the connection-time restriction unit 43, and furthermore, slides the slide member 43b to the housing direction. As the slide member 43b slides to the housing direction, the stopper member 43a is applied with a rotational force that rotates the stopper member 43a in the direction indicated by the arrow E in the drawings around the stopper rotating shaft 43c. As the rotational force opposes the connection-time restriction pressure applied to the stopper member 43a by the stopper spring 43d, the stopper member 43a is released from the notch 45b of the housing area 45a, as shown in FIG. 4. Accordingly, the restriction by the connection-time restriction unit 43 on the movement of the receiving-side connector 41 from the connection position towards the housing direction indicated by the arrow C in the drawings is canceled.

Figure 5:
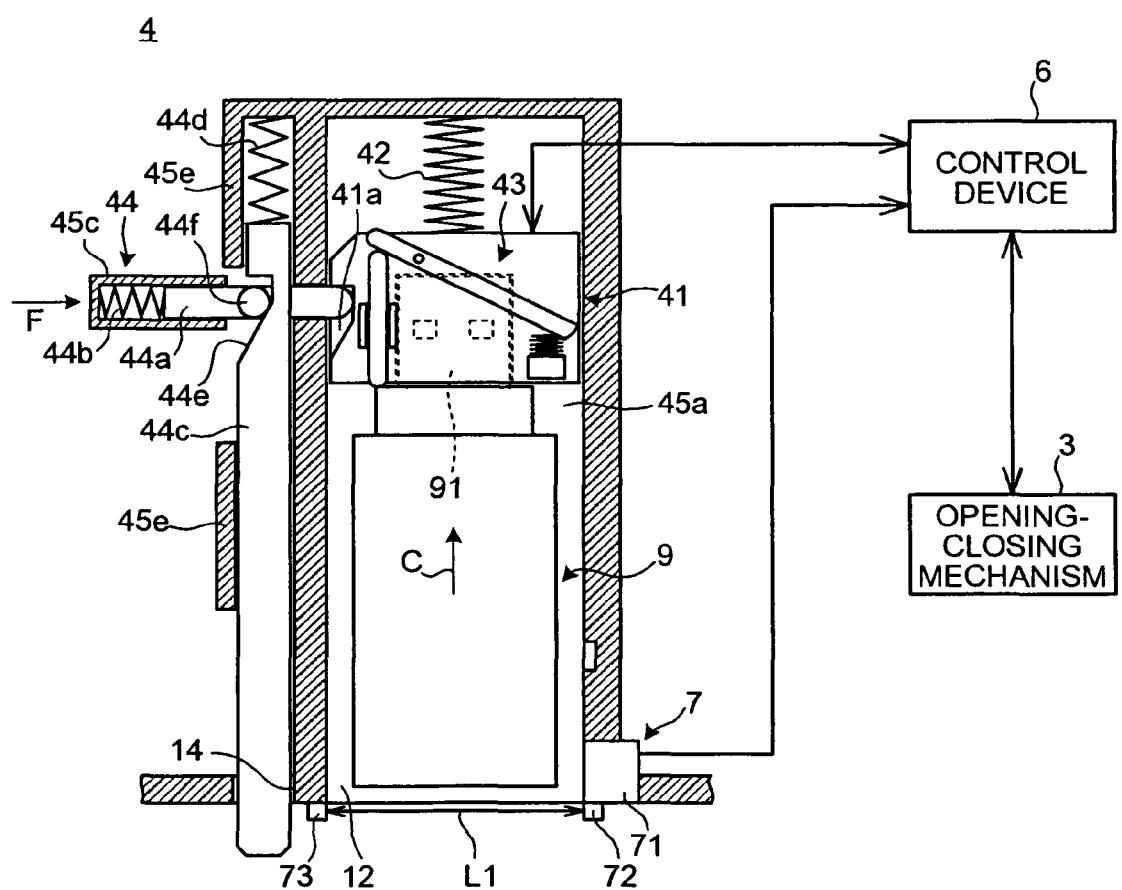
FIG. 5 is a schematic diagram for explaining a movement of the connector housing unit.

Under the state where the restriction by the connection-time restriction unit 43 is canceled, the USB memory 9 of which the connection-side connector 91 is connected to the receiving-side connector 41 is pressed further to the housing direction. As a result, as the pressure applied to the USB memory 9 opposes an ejecting pressure applied to the receiving-side connector 41 by the taking-out spring 42, the USB memory 9 is inserted further inside the housing area 45a from the USB-connection insert slot 12, as shown in FIG. 5. At the same time, the receiving-side connector 41 slides along with the USB memory 9 in the housing area 45a up to the housing position towards the housing direction indicated by the arrow C in the drawings until the USB memory 9 is entirely housed in the housing area 45a. When the receiving-side connector 41 is positioned in the housing position, as shown in FIG. 5, an end of the slid pin 44a of the housed-time restriction unit 44 comes into the notch 41a of the receiving-side connector 41. Accordingly, a movement of the receiving-side connector 41 from the housing position towards the taking-out direction is restricted by the housed-time restriction unit 44, and the USB memory 9 as the retractable connection-object electronic device is then housed in the connector housing unit 4 while the connection-side connector 91 is maintained connected to the receiving-side connector 41.

Figure 6:
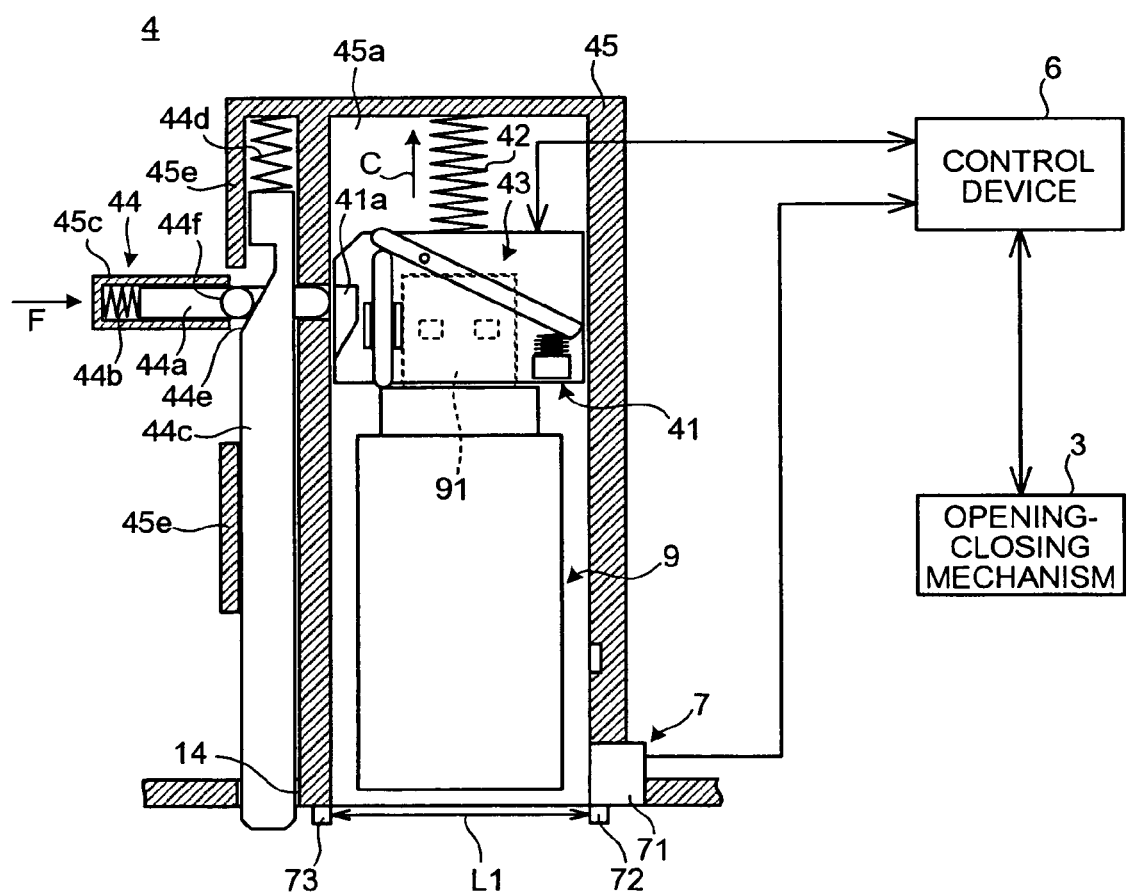
FIG. 6 is a schematic diagram for explaining a movement of the connector housing unit.

When the USB memory 9 is taken out from the connector housing unit 4 from the state where the USB memory 9 is housed in the connector housing unit 4, as shown in FIG. 6, the eject button 44c is pressed to the housing direction. As the pressure opposes the pressure applied to the eject button 44c by the eject-button spring 44d, the eject button 44c slides to the housing direction while being supported by the supporting unit 45e. At the same time, the slope 44e also moves to the housing direction, and presses the projection 44f of the slid pin 44a in contact with the slope 44e towards the reverse direction of a direction indicated by the arrow F in the drawings to which the slid pin 44a comes into the notch 41a of the receiving-side connector 41. As the pressure opposes the housed-time restriction pressure applied to the slid pin 44a by the slid-pin spring 44b, the slid pin 44a slides towards the reverse direction of the direction to which the slid pin 44a comes into the notch 41a of the receiving-side connector 41 while being supported by the supporting unit 45c. Accordingly, an end of the slid pin 44a stuck in the notch 41a of the receiving-side connector 41 is released from the notch 41a, as shown in FIG. 6, the restriction on the movement of the receiving-side connector 41 from the housing position towards the ejecting direction by the housed-time restriction unit 44 is canceled.

When the restriction by the housed-time restriction unit 44 is canceled, under the taking-out pressure applied to the receiving-side connector 41 by the taking-out spring 42, the USB memory 9 moves in the housing area 45a together with the receiving-side connector 41 connected to the connection-side connector 91 from the housing position to the taking-out direction, which is the reverse direction of the housing direction indicated by the arrow C in the drawings, and projects from the insert face 11 to the operation display panel side. Consequently, as shown in FIG. 2, the USB memory 9 is taken out from the connector housing unit 4.

Figure 7:
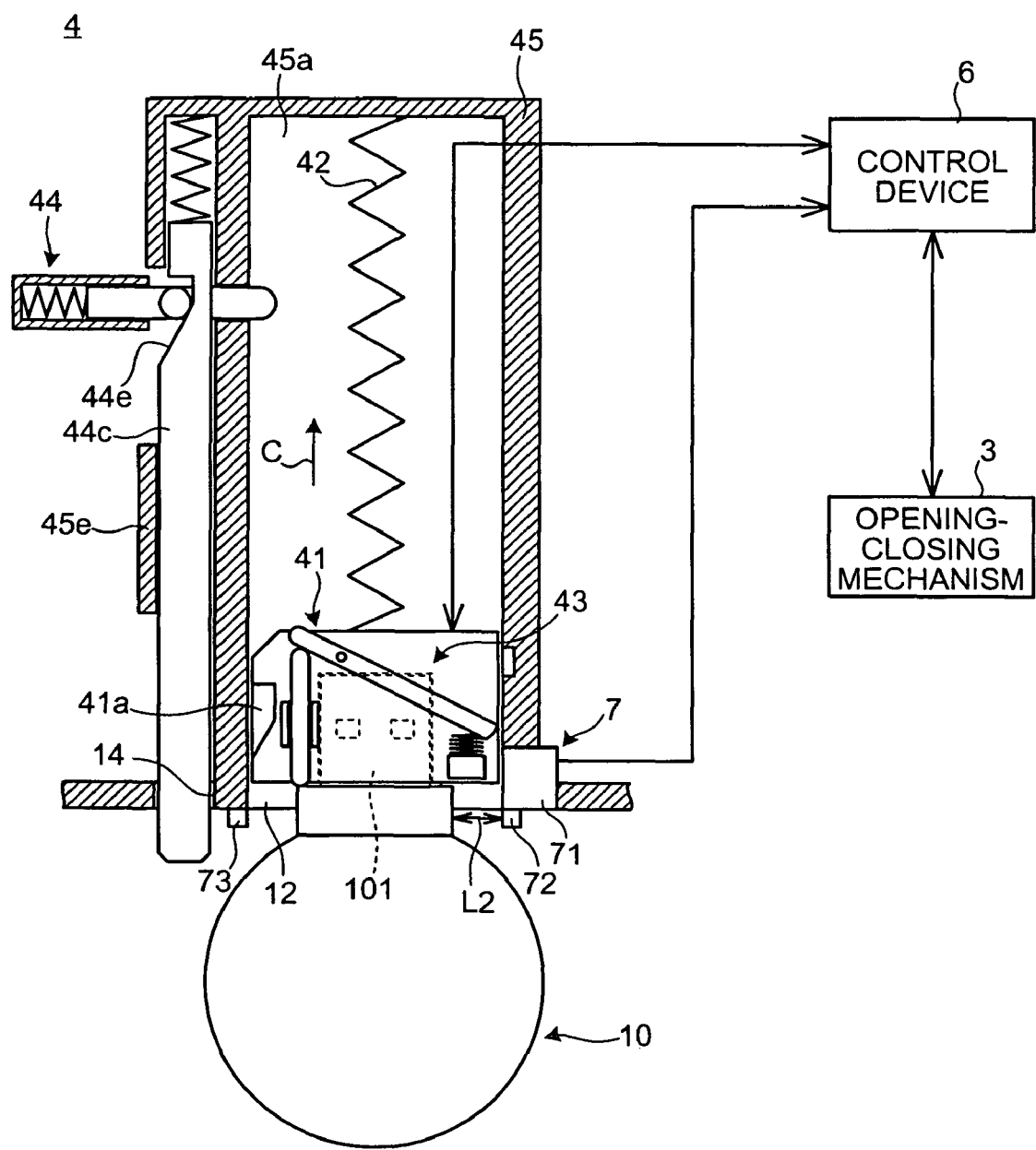
FIG. 7 is a schematic diagram for explaining a movement of the connector housing unit.

Explained below is the case of connecting a non-retractable connection-object electronic device among connection-object electronic devices, in this embodiment, a USB memory 10, to the in-vehicle electronic equipment. The USB memory 10 is configured unavailable to be inserted and housed in the housing area 45a of the connector housing unit 4, due to the shape of the USB memory 10. As shown in FIG. 7, the USB memory 10 is inserted from the USB-connection insert slot 12 into the housing area 45a by pressing the USB memory 10 to the housing direction indicated by the arrow C in the drawings. At the moment, as described above, the receiving-side connector 41 is restricted on the movement from the connection position towards the housing direction by the connection-time restriction unit 43. Accordingly, a connection-side connector 101 is connected to the receiving-side connector 41, and then the USB memory 10 is connected to the control device 6 via the receiving-side connector 41, so that the USB memory 10 is electrically connected to the in-vehicle electronic equipment 1.

At the moment, as described above, under the state where the restriction by the connection-time restriction unit 43 is canceled, the USB memory 10 of which the connection-side connector 101 is connected to the receiving-side connector 41 can be pressed towards the housing direction. However, even if the pressure applied to the USB memory 9 opposes the ejecting pressure applied to the receiving-side connector 41 by the taking-out spring 42, the USB memory 10 is not to be inserted into the housing area 45a further from the USB-connection insert slot 12. Therefore, the USB memory 10 remains projecting from the insert face 11 to the operation display panel side while maintaining an electrical connection to the in-vehicle electronic equipment 1.

The disk device 5 plays (records) a disk D by inserting a CD (Compact Disk) or a DVD (Digital Versatile Disk). An end of the disk device 5 communicates with a disk insert slot 13 on the insert face 11. The disk D is to be inserted from the disk insert slot 13 by the user. The disk D that is inserted is loaded inside the disk device 5. The disk device 5 then rotates the disk D, and reads a record on the disk D with a not-shown pickup. The disk device 5 is connected to the control device 6. Accordingly, loading, playing, and unloading of the disk D performed by the disk device 5 is controlled by the control device 6.

The control device 6 is a control unit, controls operations of the in-vehicle electronic equipment 1, particularly controls opening and closing operation of the opening-closing mechanism 3, and includes a storage unit and a processing unit, both of which are not shown. The control device 6 has a function as a connection-state determining unit. The not-shown storage unit stores therein a control process for the in-vehicle electronic equipment 1, particularly a computer program (hereinafter, "opening-closing control program") that implements an opening-closing control process for the operation display panel 2. The storage unit can be a non-volatile memory, such as a flash memory, another non-volatile memory that is only available to be read, such as ROM (Read Only Memory), or a volatile memory that can be read and written, such as RAM (Random Access Memory), or a combination of them. The processing unit is configured from a CPU (Central Processing Unit), and implements the opening-closing control process for the operation display panel 2 by loading the opening-closing control program onto the memory and executing it.

The photosensor 7 is a detecting unit, and detects a housed state of a connection-object electronic device in the connector housing unit 4. The photosensor 7 includes a body 71, a light-emitting and light-receiving unit 72, and a reflection unit 73.

The body 71 is mounted on the housing 45, and emits a light from the light-emitting and light-receiving unit 72 towards the reflection unit 73. Moreover, the body 71 is connected to the control device 6, and outputs to the control device 6 the time needed for the light irradiated from the light-emitting and light-receiving unit 72 towards the reflection unit 73 to go and return between the light-emitting and light-receiving unit 72 and the reflection unit 73.

The light-emitting and light-receiving unit 72 is provided in the vicinity of the USB-connection insert slot 12 on the insert face 11. The light-emitting and light-receiving unit 72 includes a not-shown light-emitting element, for example, a LED, and a not-shown light-receiving element, irradiates a light towards the reflection unit 73 with the light-emitting element, and receives the light with the light-receiving element.

The reflection unit 73 is provided at a position in the vicinity of the USB-connection insert slot 12 on the insert face 11 and opposite to the light-emitting and light-receiving unit 72.

The reflection unit 73 reflects the light irradiated by the light-emitting and light-receiving unit 72 to the light-emitting and light-receiving unit 72.

With the photosensor 7, unless a connection-object electronic device is present in between the light-emitting and light-receiving unit 72 and the reflection unit 73, i.e., present at the USB-connection insert slot 12 on the insert face 11, a light irradiated by the light-emitting and light-receiving unit 72 goes and returns for a distance L1 between the light-emitting and light-receiving unit 72 and the reflection unit 73. By contrast, if a connection-object electronic device is present in between the light-emitting and light-receiving unit 72 and the reflection unit 73, the light irradiated by the light-emitting and light-receiving unit 72 goes and returns for a distance L2 (see FIGS. 4 and 7), which is shorter than the distance L1 between the light-emitting and light-receiving unit 72 and the reflection unit 73. Accordingly, the photosensor 7 can detect that the connection-object electronic device projects from the insert face to the operation display panel side. In other words, the photosensor 7 can reliably detect that a connection-object electronic device of which connection-side connector is connected to the receiving-side connector 41 is not housed in the connector housing unit 4.

Figure 8:
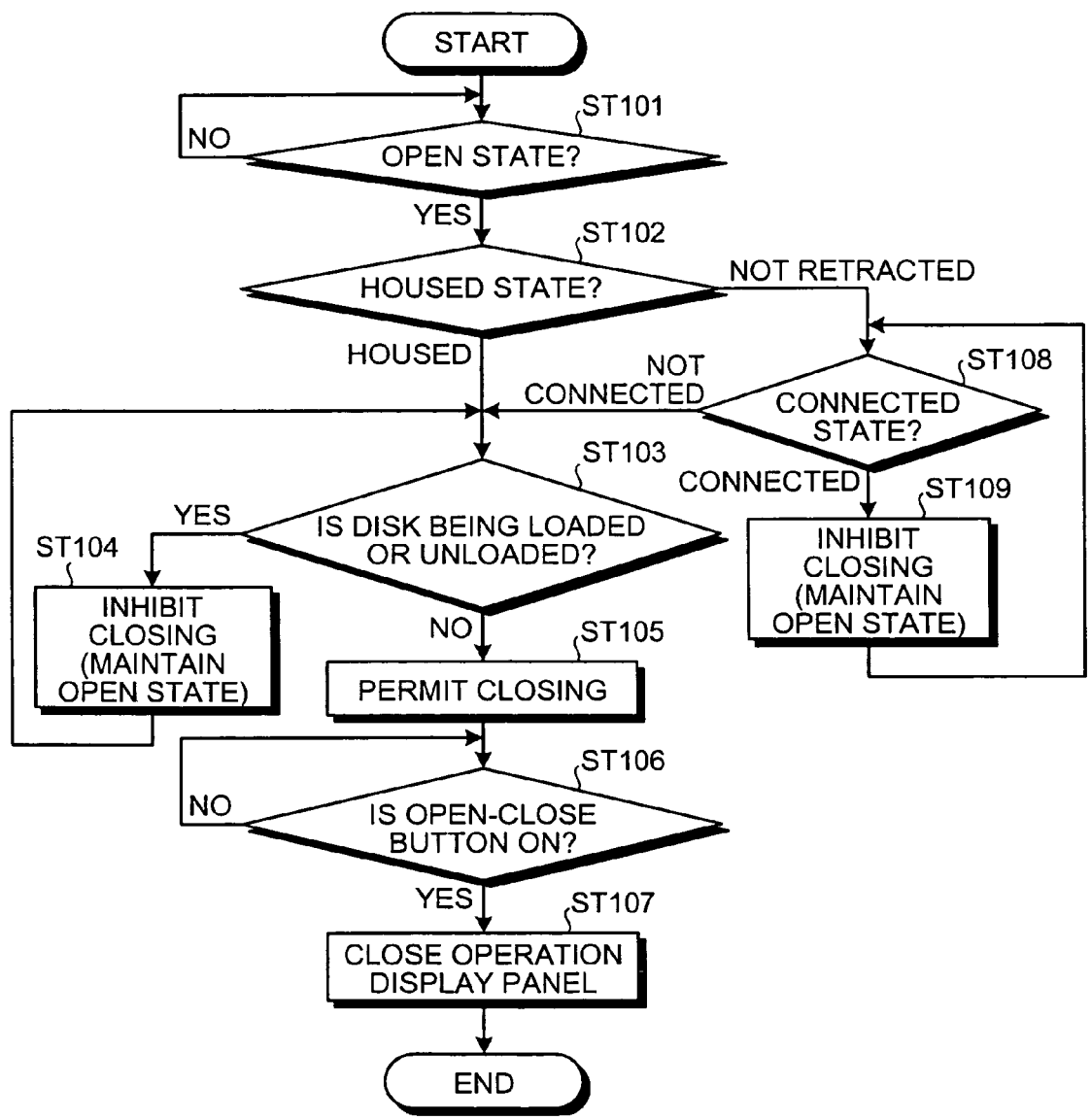
FIG. 8 is a flowchart of opening-closing control of the operation display panel.

The opening-closing control process for the operation display panel 2 is explained below. FIG. 8 is a flowchart of opening-closing control of the operation display panel. First, the control device 6 determines whether the operation display panel 2 is set in the open position by the opening-closing mechanism 3 (step ST101). For example, as a user presses the open-close button 23 when the operation display panel 2 is in the closed position, the opening-closing mechanism 3 brings the operation display panel 2 to the open position according to an open signal output from the control device 6, and then the control device 6 determines whether the operation display panel 2 is maintained in the open position, i.e., the open state.

Then, the control device 6 detects a housed state of a connection-object electronic device in the connector housing unit 4 with the photosensor 7 (step ST102). Explained below is a process of detecting by the photosensor 7 that a retractable connection-object electronic device, i.e., the USB memory 9 in this embodiment, is housed in the connector housing unit 4. Until the connection-side connector 91 is connected to the receiving-side connector 41 and the USB memory 9 is housed in the connector housing unit 4, as shown in FIG. 4, light emitted from the light-emitting and light-receiving unit 72 goes and returns for the distance L2, which is shorter than the distance L1 between the light-emitting and light-receiving unit 72 and the reflection unit 73, so that the photosensor 7 is continuously detecting whether the USB memory 9 projects from the insert face 11 to the operation display panel side.

When the USB memory 9 is entirely housed in the connector housing unit 4, as shown in FIG. 5, the light from the light-emitting and light-receiving unit 72 goes and returns for the distance L1 between the light-emitting and light-receiving unit 72 and the reflection unit 73, and then the photosensor 7 becomes not to detect whether the USB memory 9 projects from the insert face 11 to the operation display panel side. In other words, the photosensor 7 detects whether the USB memory 9 projects from the insert face 11 to the operation display panel side since the connection-side connector 91 of the USB memory 9 is not yet connected to the receiving-side connector 41, and in turn becomes not to detect whether the USB memory 9 projects from the insert face 11 to the operation display panel side. Thus, the photosensor 7 can detect that the connection-object electronic device is housed in the connector housing unit 4.

In the next step, if the control device 6 detects that the connection-object electronic device is housed in the connector housing unit 4, i.e., when the connection-object electronic device is housed, the control device 6 determines whether the disk D is being loaded or unloaded by the disk device 5 (step ST103).

In the next step, if the control device 6 determines that the disk D is being loaded or unloaded, the control device 6 inhibits the operation display panel 2 from closing (step ST104). In other words, even if an ON signal is input by the user by pressing the open-close button 23 when the operation display panel 2 is in the open position, the control device 6 does not brings the operation display panel 2 to the closed position by the opening-closing mechanism 3, and maintains it in the open position. Accordingly, even if the USB memory 9 that is a retractable connection-object electronic device has been housed in the connector housing unit 4, when the disk D projects from the disk insert slot 13 on the insert face 11 to the operation display panel side, the control device 6 can prevent a situation caused by closing the operation display panel 2 in the open position that the operation display panel 2 contacts or hits against the disk D and damages its recording surface. The control device 6 inhibits closing the operation display panel 2 by the opening-closing mechanism 3 until determining that the disk D is not being loaded or unloaded.

Upon determining that the disk D is not being loaded or unloaded, the control device 6 permits closing the operation display panel 2 (step ST105). In other words, the control device 6 controls the opening-closing mechanism 3 to bring the operation display panel 2 to the closed position in response to input of an ON signal from the user who presses the open-close button 22 when the operation display panel 2 is in the open position.

In the next step, the control device 6 determines whether the user actually presses the open-close button and an ON signal is input (step ST106).

If the control device 6 determines that the user presses the open-close button and an ON signal is input, the control device 6 then closes the operation display panel 2 (step ST107). In other words, the control device 6 outputs a close signal to the opening-closing mechanism 3, and then the opening-closing mechanism 3 brings the operation display panel 2 to the closed position. Consequently, if the connection-object electronic device of which connection-side connector is connected to the receiving-side connector is a retractable connection-object electronic device, i.e., the USB memory 9 in this embodiment, the operation display panel 2 is brought to the closed position by the opening-closing mechanism 3, and the operation display panel 2 covers the insert face 11. Thus, the user can easily view and operate the operation display panel 2. Because the connection-object electronic device, i.e., the USB memory 9 in this embodiment, is housed in the connector housing unit 4, the USB memory 9 is prevented from contacting or hitting against part of the user.

If the control device 6 does not detect that the connection-object electronic device is housed in the connector housing unit 4, i.e., when the connection-object electronic device is not housed, the control device 6 as the connection-state determining unit determines a connection state between the connection-side connector of the connection-object electronic device and the receiving-side connector 41 (step ST108). In other words, the control device 6 determines whether the receiving-side connector 41 is connected to a retractable connection-object electronic device or a non-retractable connection-object electronic device, in this embodiment, the connection-side connector 91 or 101 of the USB memory 9 or 10.

For example, the control device 6 determines whether an electrical connection to the USB memory 9 or 10 is established.

If the control device 6 determines that the connection-side connector of the connection-object electronic device is connected to the receiving-side connector 41, the control device 6 inhibits closing the operation display panel 2 (step ST109). In other words, as described above, the control device 6 does not brings the operation display panel 2 to the closed position by the opening-closing mechanism 3, and maintains the operation display panel 2 in the open position. Accordingly, when the USB memory 9 that is a retractable connection-object electronic device is not housed in the connector housing unit 4 on purpose, or when the USB memory 10 that is a non-retractable connection-object electronic device is not housed while electrically connected to the in-vehicle electronic equipment 1, this does not brings about a situation that the operation display panel 2 contacts or hits against the USB memory 9 or 10 by closing the operation display panel 2.

By contrast, if the control device 6 determines that the connection-side connector of the connection-object electronic device is not connected to the receiving-side connector 41, the control device 6 determines whether the disk D is being loaded or unloaded by the disk device 5 (step ST103). In other words, when the user does not connect the connection-object electronic device to the in-vehicle electronic equipment 1, if the control device 6 determines that the disk D is being loaded or unloaded, the control device 6 inhibits closing the operation display panel 2 with the opening-closing mechanism 3 (step ST104). If the control device 6 determines that the disk D is not being loaded or unloaded, the control device 6 permits closing the operation display panel 2 with the opening-closing mechanism 3 (step ST105).

Accordingly, forced cancellation of the electrical connection to the USB memory 9 or 10 can be prevented regardless of the shape of the USB memory 9 or 10 of which the connection-side connector 91 or 101 is connected to the receiving-side connector 41. If the electrical connection to the USB memory 9 or 10 is not be forcedly canceled by closing the operation display panel 2, the control device 6 permits closing the operation display panel 2 with the opening-closing mechanism 3. Consequently, the opening-closing mechanism 3 brings the operation display panel 2 to the closed position, and the operation display panel 2 covers the insert face 11. Thus, worsened visibility and inferior operationality of the operation display panel 2 for the user can be avoided.

Figure 9:
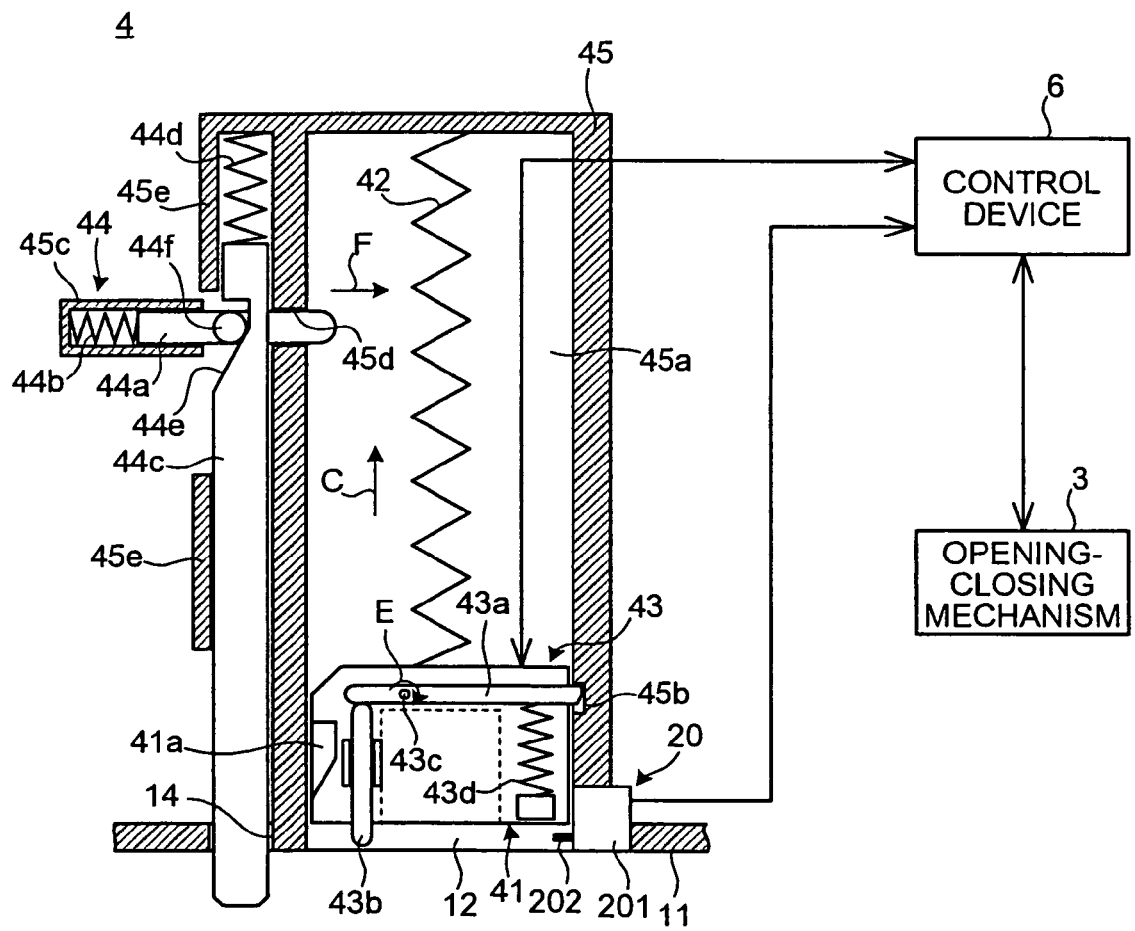
FIG. 9 is a schematic diagram that depicts a configuration example of a detecting unit.
Figure 9:
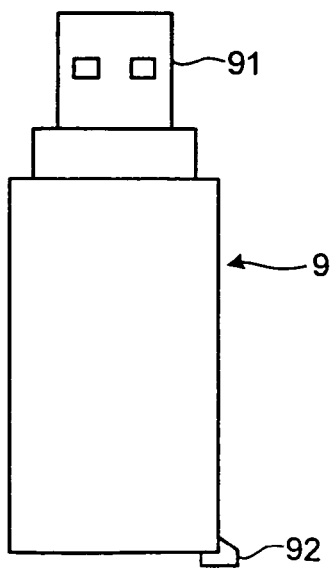
Figure 10:
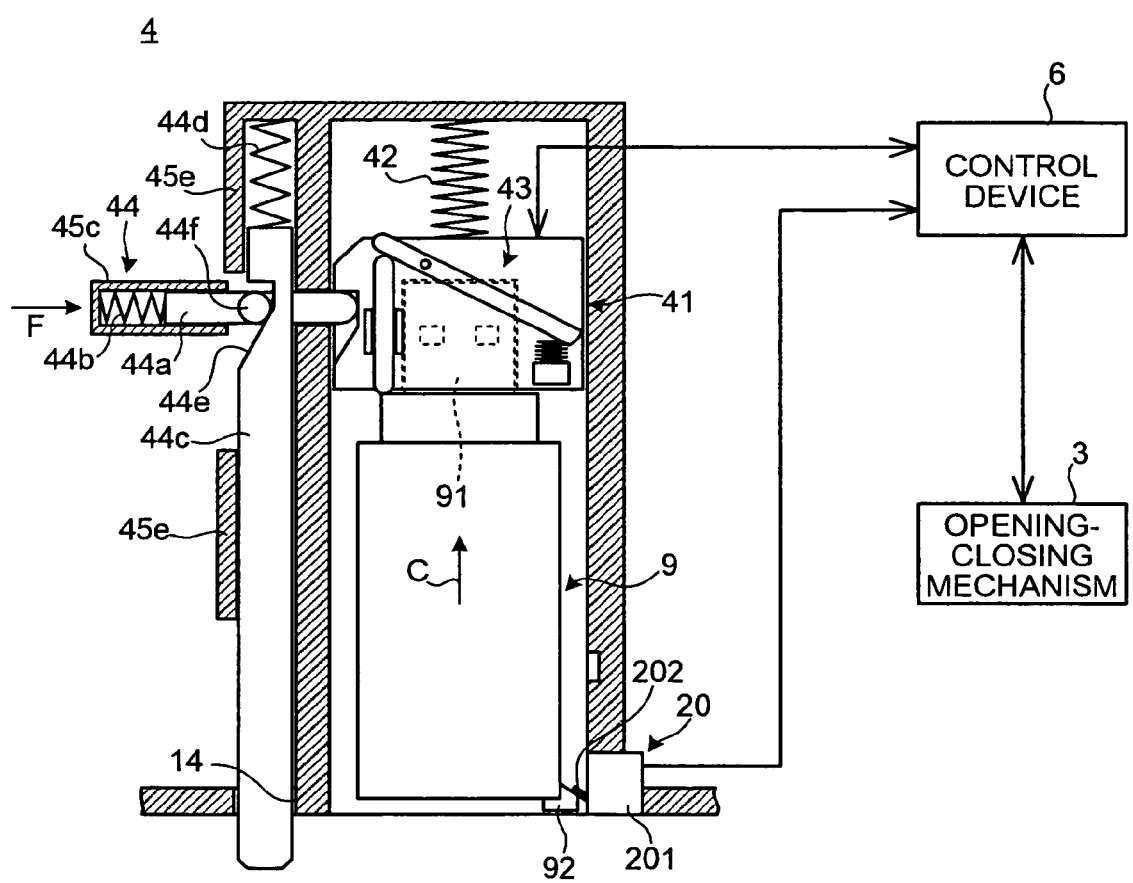
FIG. 10 is a schematic diagram for explaining a movement of the detecting unit.

According to the example embodiment, the photosensor 7 is used as the detecting unit; however, the present invention is not so limited. For example, the housed state of a connection-object electronic device can be detected by a switch that turns on upon being pressed by or contacting with the connection-object electronic device. FIG. 9 is a schematic diagram that depicts a configuration example of the detecting unit. FIG. 10 is a schematic diagram for explaining a movement of the detecting unit.

For example, as shown in FIG. 9, a switch 20 is attached instead of the photosensor 7 on the housing 45. The switch 20 is configured to turn on by contacting a projection 92 formed on the USB memory 9 that is a retractable connection-object electronic device.

The switch 20 is a detecting unit, and detects a housed state of a connection-object electronic device in the connector housing unit 4. The switch 20 includes a body 201 and a contact area 202.

The body 201 is attached to the housing 45. The body 201 is connected to the control device 6, and configured to output to the control device 6 that the contact area 202 contacts the projection 92 of the USB memory 9.

The contact area 202 is arranged in the vicinity of the USB-connection insert slot 12 on the insert face 11. In other words, as shown in FIG. 10, the contact area 202 is arranged at a position at which the projection 92 of the USB memory 9 comes into contact with the contact area 202 when the USB memory 9 that is a retractable connection-object electronic device is housed in the connector housing unit 4 such that the USB memory 9 does not project from the insert face 11 to the operation display panel side.

Therefore, the switch 20 turns on as the USB memory 9 that is a retractable connection-object electronic device of which the connection-side connector 91 is connected to the receiving-side connector 41, and on which the projection 92 is formed is housed in the connector housing unit 4. The body 201 then outputs an ON signal to the control device 6. Accordingly, the control device 6 can detect with the switch 20 that a connection-object electronic device is housed in the connector housing unit 4 (step ST102) in the opening-closing control process for the operation display panel 2 shown in FIG. 8. In other words, the control device 6 can detect that the USB memory 9 as a retractable connection-object electronic device is housed in the connector housing unit 4, according to the ON signal output to the control device 6, as the projection 92 contacts the contact area 202. Accordingly, the control device 6 can reliably detect that a connection-object electronic device is not housed in the connector housing unit, as long as the connection-object electronic device can contact the switch 20, even if the connection-object electronic device is a connection-object electronic device other than the USB memory 9 that is a retractable connection-object electronic device capable of being housed in the connector housing unit 4, for example, the USB memory 10.

According to the example embodiment, after the control device 6 permits closing the operation display panel 2, the user presses the open-close button 23, as a result, the control device 6 outputs the close signal to the opening-closing mechanism 3, so that the opening-closing mechanism 3 closes the operation display panel 2. However, the present invention is not limited to this. For example, it can be configured such that the control device 6 permits closing the operation display panel 2, at the same time, the control device 6 outputs the close signal to the opening-closing mechanism 3, and closes the operation display panel 2.

As described above, the in-vehicle electronic equipment 1 of the example embodiment that includes the operation display panel 2, and the opening-closing mechanism 3 that uncovers the insert face 11 by opening the operation display panel 2, further includes the connector housing unit 4, the photosensor 7, and the control device 6. The connector housing unit 4 includes the receiving-side connector 41 configured to be uncovered at the insert face 11, and to be connected to the connection-side connector 91 or 101 of the USB memory 9 or 10 that is a connection-object electronic device capable of data communication when electrically connected to the in-vehicle electronic equipment 1. The connector housing unit 4 houses the USB memory 9 that is a retractable connection-object electronic device, among connection-object electronic devices, together with the receiving-side connector 41 connected to the connection-side connector 91. The photosensor 7 detects a housed state of the USB memory 9 or 10 as a connection-object electronic device in the connector housing unit 4. The control device 6 controls opening and closing of the opening-closing mechanism 3. While the operation display panel 2 is in the open position, if the photosensor 7 detects that the USB memory 9 as a connection-object electronic device is housed in the connector housing unit 4, the operation display panel 2 is permitted to close, and when the photosensor does not detect that the USB memory 9 or 10 as a connection-object electronic device is housed in the connector housing unit 4, the operation display panel 2 is inhibited to close. Thus, it is possible to provide the electronic equipment that can prevent forced cancellation of an electrical connection to the connection-object electronic device regardless of the shape of the connection-object electronic device of which connection-side connector is connected to the receiving-side connector, and can avoid worsened visibility and inferior operationality of the operation display panel.

INDUSTRIAL APPLICABILITY

As described above, the present invention is effectively applicable to electronic equipment that performs data communication by being electrically connected to in-vehicle electronic equipment. Particularly, the present invention is effective for preventing forced cancellation of an electrical connection to a connection-object electronic device regardless of the shape of the connection-object electronic device of which connection-side connector is connected to a receiving-side connector.

The invention claimed is:

1. Electronic equipment comprising:
    an display unit through which operation to be performed is specified and on which status of the operation is displayed;
    an opening-closing mechanism that selectively moves the display unit to an open position and a closed position, and uncovers an insert face by bringing the display unit to the open position;
    a housing unit that includes a connector arranged on the insert face and configured to be connected to a device capable of data communication when electrically connected to the electronic equipment, the device including a first device that can be housed in the housing unit and a second device that cannot be housed in the housing unit, and that is configured to house the first device with the connector connected to the first device;
    a detecting unit that detects whether the first device is housed in the housing unit; and
    a control device that controls the opening-closing mechanism, wherein
    when the first device is housed in the housing unit while the display unit is in the open position, the control unit controls the opening-closing mechanism to bring the display unit to the closed position, and
    when the first device is not housed in the housing unit while the display unit is in the open position, the control unit controls the opening-closing mechanism not to bring the display unit to the closed position.

2. The electronic equipment according to claim 1, further comprising a determining unit that determines whether the electronic equipment is electrically connected to the device, wherein
    when the electronic equipment is not electrically connected to the device and the first device is not housed in the housing unit while the display unit is in the open position, the control unit controls the opening-closing mechanism to bring the display unit to the closed position, and
    when the electronic equipment is electrically connected to the device and the first device is not housed in the housing unit while the display unit is in the open position, the control unit controls the opening-closing mechanism not to bring the display unit to the closed position.

3. The electronic equipment according to claim 1, wherein the detecting unit is a photosensor that detects that the device projects from the insert face towards the display unit.

4. The electronic equipment according to claim 1, wherein the detecting unit is a switch that is configured to turn on in response to contact with the device when the device is housed in the housing unit such that the device does not project from the insert face.

5. The electronic equipment according claim 1, wherein the electronic equipment is configured to be mounted inside a vehicle.

* * * * *